(12) United States Patent
Harper et al.

(10) Patent No.: US 10,910,011 B1
(45) Date of Patent: Feb. 2, 2021

(54) DATA STORAGE DEVICE OPERATED AT DIFFERENT SPIN SPEEDS

(71) Applicant: Western Digital Technologies, Inc., San Jose, CA (US)

(72) Inventors: Curtis A. Harper, Berthoud, CO (US); Paul E. Movall, Rochester, MN (US); Scott E. Burton, Westminster, CO (US); David R. Hall, Rochester, MN (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/777,191

(22) Filed: Jan. 30, 2020

(51) Int. Cl.
| G11B 20/12 | (2006.01) |
| G11B 19/26 | (2006.01) |
| G06F 1/3234 | (2019.01) |
| G11B 19/28 | (2006.01) |

(52) U.S. Cl.
CPC ............ *G11B 19/26* (2013.01); *G06F 1/3268* (2013.01); *G11B 19/28* (2013.01)

(58) Field of Classification Search
CPC ........... G11B 27/36; G11B 5/16; G11B 20/12; G11B 5/00; G11B 15/02; G11B 19/02; G11B 5/5526; G11B 19/2009; G11B 20/00101; G11B 27/02; G11B 7/09; G11B 2020/1281; G11B 2020/10981; G11B 2020/1099
USPC ................. 360/15, 48, 55, 64, 78.04, 99.04; 369/47.2, 47.13, 47.36, 47.38, 47.43
See application file for complete search history.

(56) References Cited

U.S. PATENT DOCUMENTS

| RE32,194 E * | 6/1986 | Machida ................ G11B 19/28 386/222 |
| 5,619,387 A | 4/1997 | Ottesen et al. |
| 6,131,138 A * | 10/2000 | Packer .................. G11B 19/26 369/14 |
| 6,493,176 B1 | 12/2002 | Deng et al. |
| 6,690,879 B2 * | 2/2004 | Uchida ................ G11B 5/0086 386/323 |
| 6,741,414 B1 | 5/2004 | Boyd et al. |
| 7,143,203 B1 | 11/2006 | Altmejd |
| 9,111,578 B1 * | 8/2015 | Hassel .................. G11B 5/012 |
| 9,214,188 B1 | 12/2015 | Tan et al. |
| 9,286,932 B2 | 3/2016 | Anderson et al. |
| 9,626,997 B1 | 4/2017 | Yang |
| 9,653,110 B2 | 5/2017 | Li |
| 9,665,293 B2 | 5/2017 | Lin et al. |

(Continued)

FOREIGN PATENT DOCUMENTS

| JP | 2006-294158 | 10/2006 |
| JP | 2019-053800 | 4/2019 |

OTHER PUBLICATIONS

International Search Report for corresponding Intl Application No. PCT/US2020/038068 dated Oct. 21, 2020.

*Primary Examiner* — Nabil Z Hindi (57) ABSTRACT

A data storage device is disclosed comprising a head actuated over a disk. The disk is spun at a first speed while writing first data to the disk based on a first disk format defining a first capacity for the disk. When a command is received from a host to spin the disk at a second speed different from the first speed, the disk is spun at the second speed while writing second data to the disk based on a second disk format defining a second capacity for the disk different from the first capacity.

19 Claims, 7 Drawing Sheets

(56) References Cited

U.S. PATENT DOCUMENTS

| | | | |
|---|---|---|---|
| 9,741,391 B1* | 8/2017 | Jin | G06F 11/1076 |
| 10,096,338 B2* | 10/2018 | Hasegawa | G11B 20/00007 |
| 10,268,400 B2 | 4/2019 | Ravimohan et al. | |
| 10,318,173 B2* | 6/2019 | Ooi | G06F 3/061 |
| 2003/0174433 A1 | 9/2003 | Espeseth et al. | |
| 2005/0144491 A1 | 6/2005 | Zayas | |
| 2006/0077815 A1* | 4/2006 | Komoda | G11B 19/02 360/48 |
| 2006/0218416 A1 | 9/2006 | Gururangan et al. | |
| 2009/0190245 A1* | 7/2009 | Nakata | G11B 5/6064 360/31 |
| 2010/0182713 A1 | 7/2010 | Gao et al. | |

\* cited by examiner

DATA STORAGE DEVICE OPERATED AT DIFFERENT SPIN SPEEDS

BACKGROUND

Data storage devices such as disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and embedded servo sectors. The embedded servo sectors comprise head positioning information (e.g., a track address) which is read by the head and processed by a servo controller to control the velocity of the actuator arm as it seeks from track to track.

Figure 1:
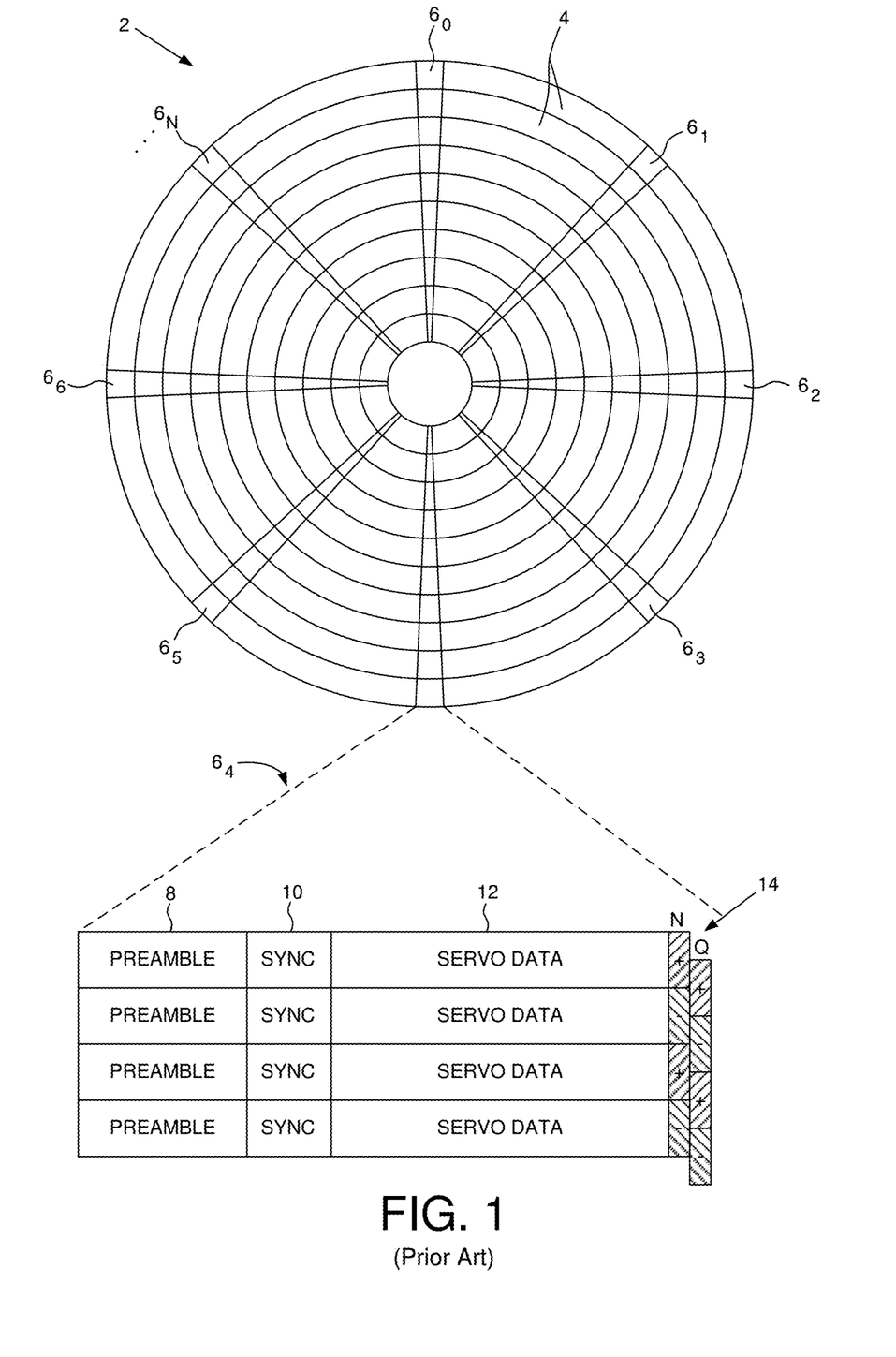
FIG. 1 shows a prior art disk format comprising a plurality of servo tracks defined by servo sectors.

A disk drive typically comprises a plurality of disks each having a top and bottom surface accessed by a respective head. That is, the VCM typically rotates a number of actuator arms about a pivot in order to simultaneously position a number of heads over respective disk surfaces based on servo data recorded on each disk surface. FIG. 1 shows a prior art disk format 2 as comprising a number of servo tracks 4 defined by servo sectors $6_0$-$6_N$ recorded around the circumference of each servo track. Each servo sector comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

DETAILED DESCRIPTION

Figure 2A:
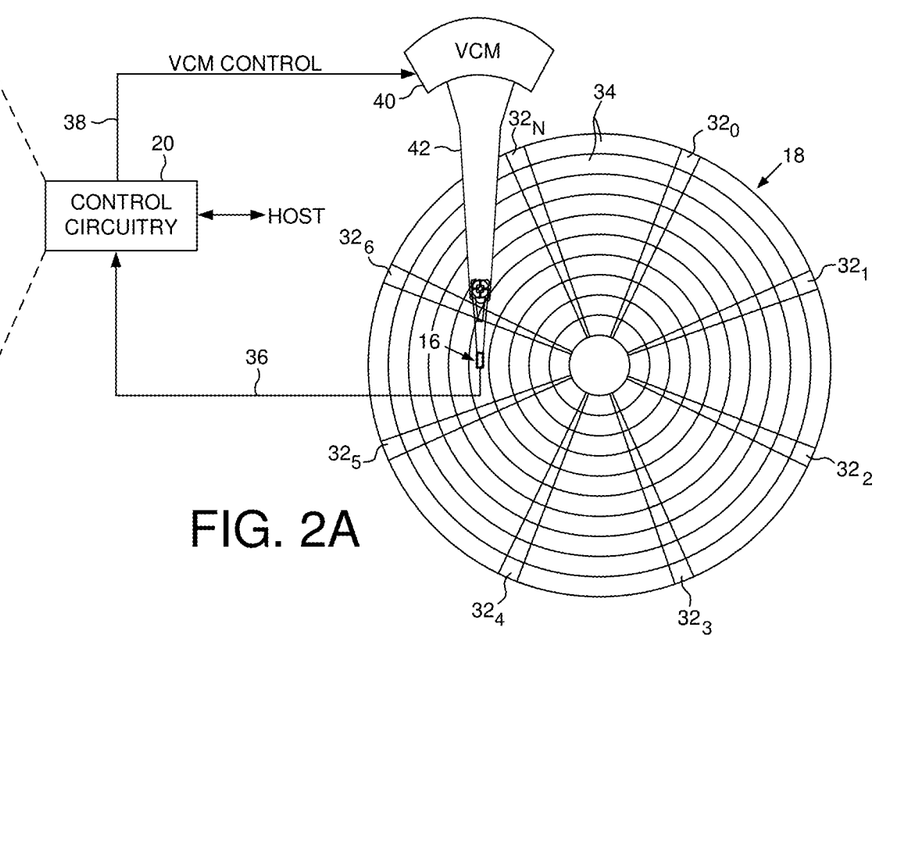
FIG. 2A shows a data storage device in the form of a disk drive according to an embodiment comprising a head actuated over a disk.
Figure 2B:
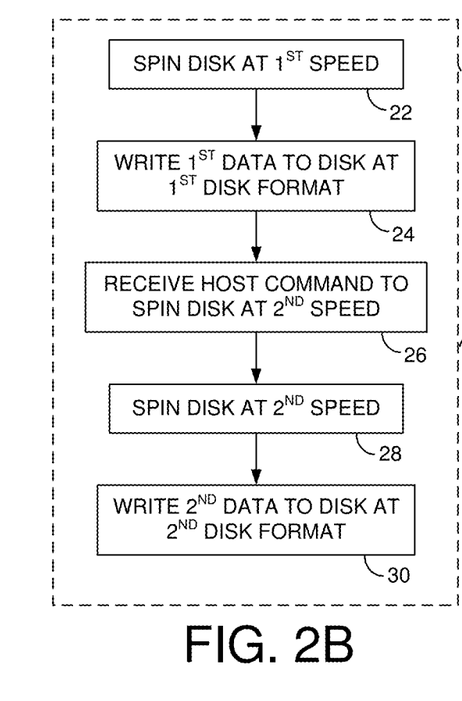
FIG. 2B is a flow diagram according to an embodiment wherein data is written to the disk based on at least two different disk formats while operating at different spin speeds.

FIG. 2A shows a data storage device in the form of a disk drive according to an embodiment comprising a head 16 actuated over a disk 18, and control circuitry 20 configured to execute the flow diagram of FIG. 2B wherein the disk is spun at a first speed (block 22) while writing first data to the disk based on a first disk format defining a first capacity for the disk (block 24). A command is received from a host to spin the disk at a second speed different from the first speed (block 26), wherein the disk is spun at the second speed (block 28) while writing second data to the disk based on a second disk format defining a second capacity for the disk different from the first capacity (block 30).

In the embodiment of FIG. 2A, the disk 18 comprises a plurality of servo sectors $32_0$-$32_N$ that define a plurality of servo tracks, wherein data tracks 34 are defined relative to the servo tracks at the same or different radial density. The control circuitry 20 processes a read signal 36 emanating from the head 16 to demodulate the servo sectors and generate a position error signal (PES) representing an error between the actual position of the head and a target position relative to a target track. A servo control system in the control circuitry 20 filters the PES using a suitable compensation filter to generate a control signal 38 applied to a VCM 40 which rotates an actuator arm 42 about a pivot in order to actuate the head radially over the disk in a direction that reduces the PES. The servo sectors $32_0$-$32_N$ may comprise any suitable head position information, such as a track address for coarse positioning and servo bursts for fine positioning. The servo bursts may comprise any suitable pattern, such as an amplitude based servo pattern or a phase based servo pattern (FIG. 1).

There are a number of factors that may affect the capacity of the disk 18, such as a radial density of the data tracks or a linear bit density of the data sectors recorded in each data track. In another embodiment, the capacity of the disk 18 may be increased by overlapping the data tracks in a disk format referred to as shingled magnetic recording (SMR). As the spin speed of the disk 18 increases, the fidelity of the read signal typically decreases due to a number of factors, such as spindle induced vibrations and windage effects. Accordingly when a disk drive is operated at a higher spin speed, a suitable disk format is typically selected to account for the resulting disturbances. For example, the data track density may be decreased to reduce intertrack interference (ITI), or the linear bit density may be decreased to reduce intersymbol interference (ISI), thereby decreasing the overall capacity of the disk.

In one embodiment, a host may reconfigure a disk drive to operate at different spin speeds based on any suitable operating conditions. For example in an embodiment described below, a host may reconfigure a disk drive from a hot disk drive (one with high performance and high power consumption) to a cold disk drive (one with lower performance and lower power consumption). In one embodiment when the host reconfigures the spin speed of a disk drive, the disk drive may operate in a dual format mode. That is, the disk drive may operate according to a first disk format corresponding to data tracks written while spinning at a first speed, and a second disk format corresponding to data tracks written while spinning at a second speed.

Figure 3:
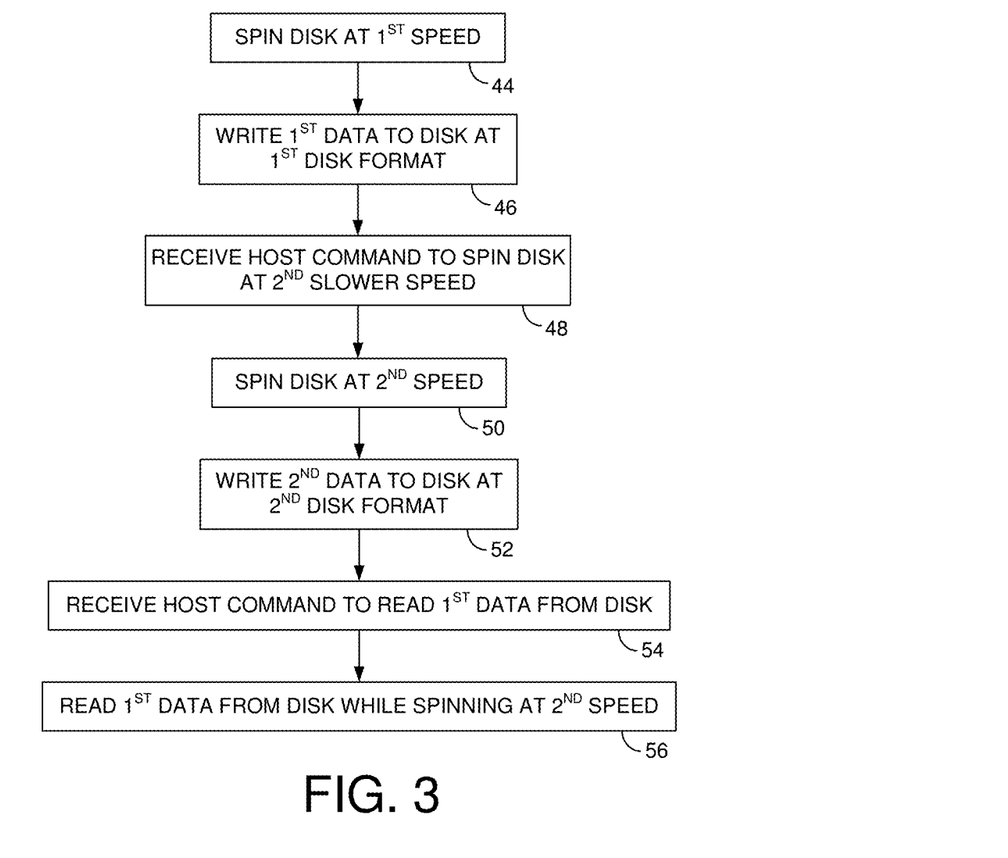
FIG. 3 is a flow diagram according to an embodiment wherein data written to the disk while spinning the disk at a first speed is read from the disk while spinning the disk at a second, different speed.

An example of this embodiment is understood with reference to the flow diagram of FIG. 3 wherein while spinning the disk at a first speed (block 44) first data is written to the disk based on a first (lower capacity) disk format (block 46). The control circuitry receives a command from the host to change the spin speed to a slower spin speed (block 48), and while spinning the disk at the slower speed (block 50), second data is written to the disk based on a second (higher capacity) disk format (block 52). When the control circuitry receives a command to read the first data (block 54), the first data is read from the disk based on the first (lower capacity) disk format while spinning the disk at the slower speed (block 56). That is in this embodiment, even though the first data is written to the disk based on the first disk format while spinning the disk at the higher speed, the first data is still recoverable while spinning the disk at the slower speed. In this manner, the disk drive operates based on the first disk format when reading data that was written at the higher spin speed, and operates based on the second disk format when writing/reading data while the disk is spinning at the slower speed.

Figure 4:
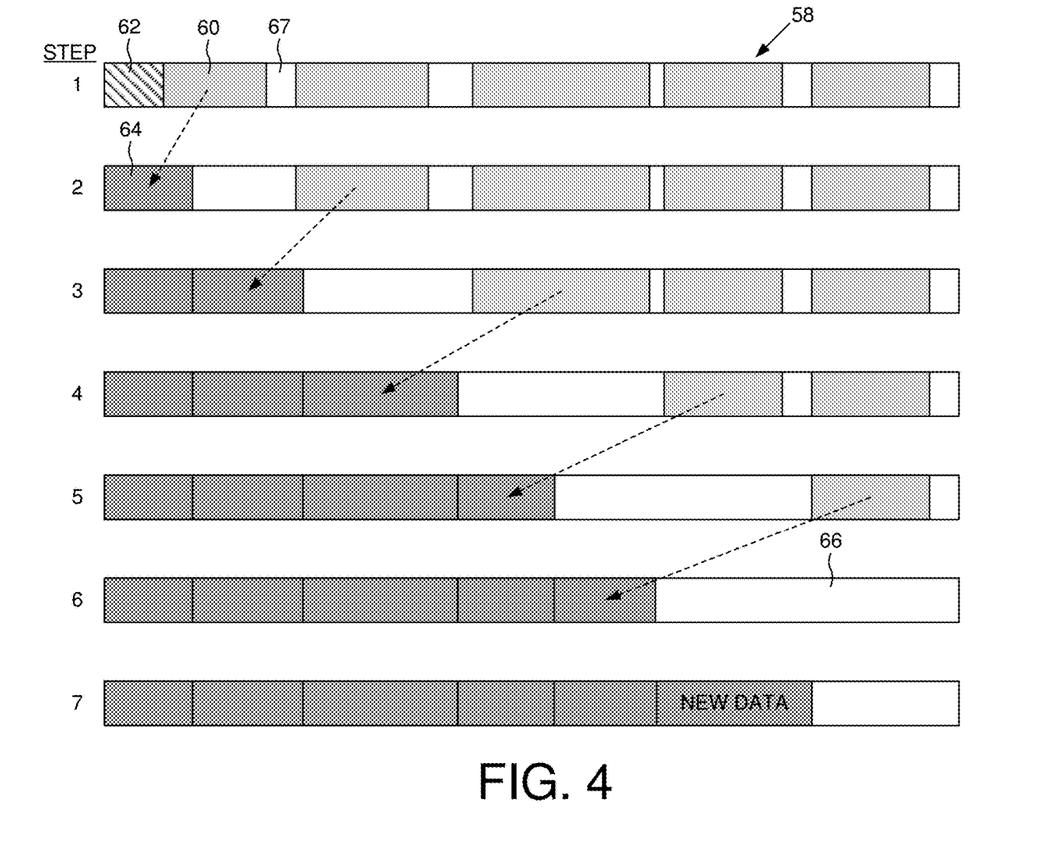
FIG. 4 shows an embodiment wherein after configuring the disk drive to operate at a slower spin speed, data recorded at a faster spin speed is rewritten to the disk based on a higher capacity disk format.

In one embodiment, when the host decreases the spin speed of a disk drive (e.g., from 7200 RPM to 5400 RPM), the previously written data is rewritten to the disk based on a higher capacity disk format while the disk is spinning at the slower speed. An example of this embodiment is shown in FIG. 4 wherein the entire capacity of the disk drive is shown as a continuous span of memory 58 representing one or more disk surfaces. In this embodiment, the disk drive is initially configured to operate at a higher spin speed wherein data (e.g., data segment 60) is written to the disk(s) based on a first (lower capacity) disk format during Step 1 of FIG. 4. At least one gap segment 62 is reserved (e.g., at the beginning of the memory span 58) wherein data is not written to the gap segment 62 while the disk drive is operating at the higher spin speed. At some point the control circuitry 20 receives a command from the host to reconfigure the spin speed to a slower spin speed, for example, to convert the disk drive from a hot disk drive to a cold disk drive. After reducing the spin speed of the disks, in one embodiment the control circuitry 20 rewrites the previously written data based on a second (higher capacity) disk format corresponding to the slower spin speed. For example, at Step 2 of FIG. 4 data segment 60 is read form the disk(s) and rewritten as data segment 64 based on the second disk format. When rewriting data segment 60, the data is first written to the reserved segment 62 so that none of the previously written data is overwritten. In this manner, the data written based on the first disk format (while spinning at the higher spin speed) may still be read from the disk(s) while spinning at the slower spin speed. That is, in one embodiment the data previously written while operating at the higher spin speed remains compatible (recoverable) while operating the disk drive at the slower spin speed. Referring again to Step 2 of FIG. 4, the rewritten data segment 64 is shorter than the previously written data segment 60 due to the higher capacity of the second disk format. During Steps 3-6 of FIG. 4, the remaining data segments are rewritten to the disk(s) at the higher capacity disk format. Once all of the data has been rewritten at Step 6, there may be a significant segment 66 of additional memory available (due to writing at the higher capacity disk format) for storing new host data as shown in Step 7.

In the example shown in Step 1 of FIG. 4, there may be a number of gap segments (e.g., gap segments 67) in the memory span 58 that may occur due to a number of possible reasons. For example, in one embodiment a gap segment may occur due to the host deleting or truncating a previously written file thereby causing disk fragmentation. In one embodiment, when the host transmits a command to decrease the spin speed of the disk drive, the host also transmits information about the host's file system. For example, the host may transmit the current valid LBA ranges of existing files, or the LBA ranges of deleted or truncated files (i.e., the previously written now "free" LBAs). In this manner when the control circuitry 20 of the disk drive is rewriting the previously written data such as shown in the example of FIG. 4, only the valid LBAs corresponding to valid host data may be rewritten (the gap segments may be ignored).

Figure 5A:
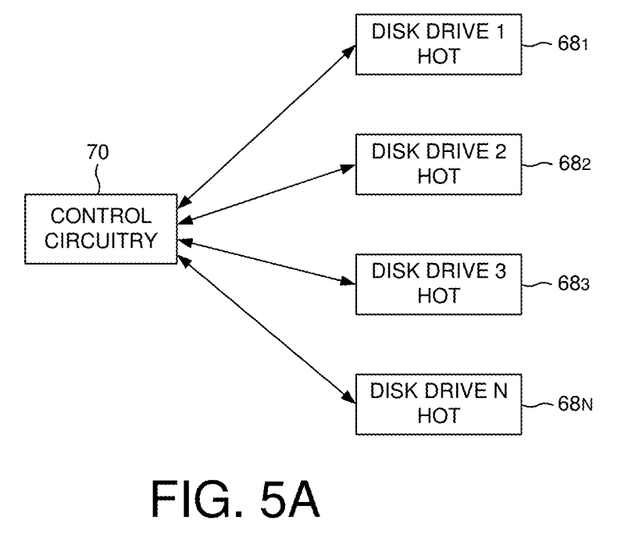
FIG. 5A shows an embodiment wherein the data storage device comprises a plurality of disk drives initially configured as hot disk drives.

FIG. 5A shows a data storage device according to an embodiment comprising a plurality of disk drives, including a first disk drive 68$_1$ comprising a first disk and a second disk drive 68$_2$ comprising a second disk. The data storage device further comprises control circuitry 70 configured to command the first disk drive 68$_1$ to spin the first disk at a first speed while writing first data to the first disk, and command the second disk drive 68$_2$ to spin the second disk at the first speed while writing second data to the second disk. At some point, the control circuitry 70 transfers at least part of the first data from the first disk drive 68$_1$ to the second disk drive 68$_2$, and commands the second disk drive 68$_2$ to spin the second disk at a second speed slower than the first speed while writing third data to the second disk.

In one embodiment, the control circuitry 70 shown in FIG. 5A may comprise a server that implements part of a cloud based storage system or enterprise storage system. In either case, the data stored on the disk drives is typically either hot data meaning it is accessed frequently or cold data meaning it is accessed infrequently. It is estimated that over half of Internet and enterprise data eventually becomes cold data that is accessed very infrequently. It has become a significant challenge to store this mountain of cold data cost effectively with factors such as cost per gigabyte and power consumption affecting the overall storage cost.

When new data is initially stored by a data storage device, the probability of the data becoming cold data is typically unknown. Accordingly newly written data is typically characterized as hot data, and then later migrated from a hot storage device to a lower cost storage device, such as migrating hot data from a solid state drive (SSD) to a lower cost disk drive. However, migrating cold data to a lower cost storage device can itself be an expensive process by consuming bandwidth that might otherwise be better utilized to service client demands.

Figure 5B:
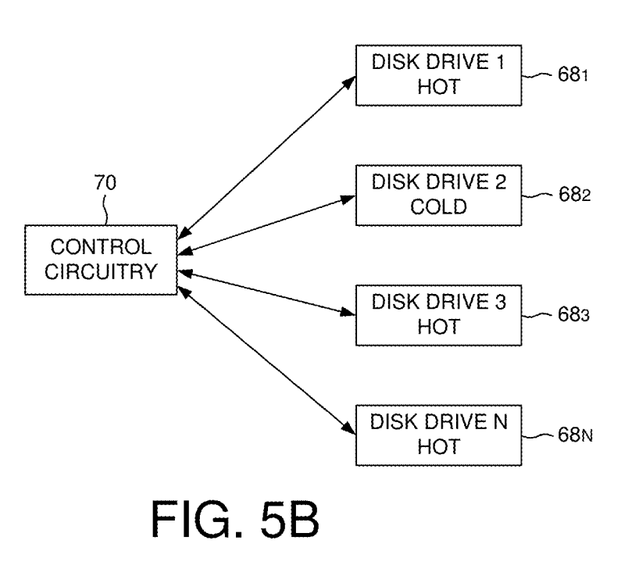
FIG. 5B shows an embodiment wherein one of the hot disk drives is converted into a cold disk drive wherein the spin speed of the disk drive is decreased.

Referring again to FIG. 5A, in one embodiment the plurality of disk drives installed into the data storage device may be initially configured as hot disk drives for storing hot data. For example, each disk drive installed into the data storage device may be default configured to operate at a high spin speed and corresponding lower capacity disk format, thereby improving the throughput in trade for higher cost per gigabyte and higher power consumption. However in one embodiment, fifty to ninety percent of the data stored on the hot disk drives in FIG. 5A eventually becomes cold data due to being infrequently accessed. Instead of migrating cold data away from a particular hot disk drive, in one embodiment the control circuitry 70 reconfigures a hot disk drive into a cold disk drive (e.g., hot disk drive 68$_2$ in FIG. 5A may be reconfigured into a cold disk drive 68$_2$ as shown in FIG. 5B). In one embodiment, reconfiguring a hot disk drive into a cold disk drive includes commanding the disk drive to operate at a slower spin speed and corresponding higher capacity disk format, thereby decreasing the storage cost in terms of cost per gigabyte as well as the cost of power consumption. Reconfiguring a disk drive into a cold disk drive may also reduce the operating cost of the data storage device by avoiding the cost of migrating cold data away from the reconfigured disk drive. That is the cold data stored in a reconfigured disk drive remains on the disk drive, thereby avoiding the bandwidth consumption that would otherwise be required to migrate the cold data to a different storage device. Any suitable criteria may be used to reclassify a hot disk drive as a cold disk drive, for example, when a hot disk drive reaches a predetermined free capacity threshold and also stores a majority of cold data.

In one embodiment described below, after reconfiguring a host disk drive into a cold disk drive, cold data from other hot disk drives may be migrated to the cold disk drive, such as by migrating cold data from hot disk drive 68$_3$ to cold disk drive 68$_2$ in FIG. 5B. In this manner the full capacity of a reconfigured cold disk drive may be utilized to store cold data. When a cold disk drive reaches its full capacity, in one embodiment the cold disk drive may be swapped out for a hot disk drive, wherein the cold disk drive may then be installed into a data storage device dedicated to storing cold data. For example, a data storage device dedicated to storing cold data may be configured with a more cost effective power source for powering an array of cold disk drives as compared to powering an array of hot and cold disk drives such as shown in FIGS. 5A and 5B. In addition, swapping a full cold disk drive for an empty hot disk drive may improve the write performance of the data storage device shown in FIG. 5B by increasing the number of hot disk drives available for concurrent writing (i.e., increasing the number of concurrent write streams).

Figure 6A:
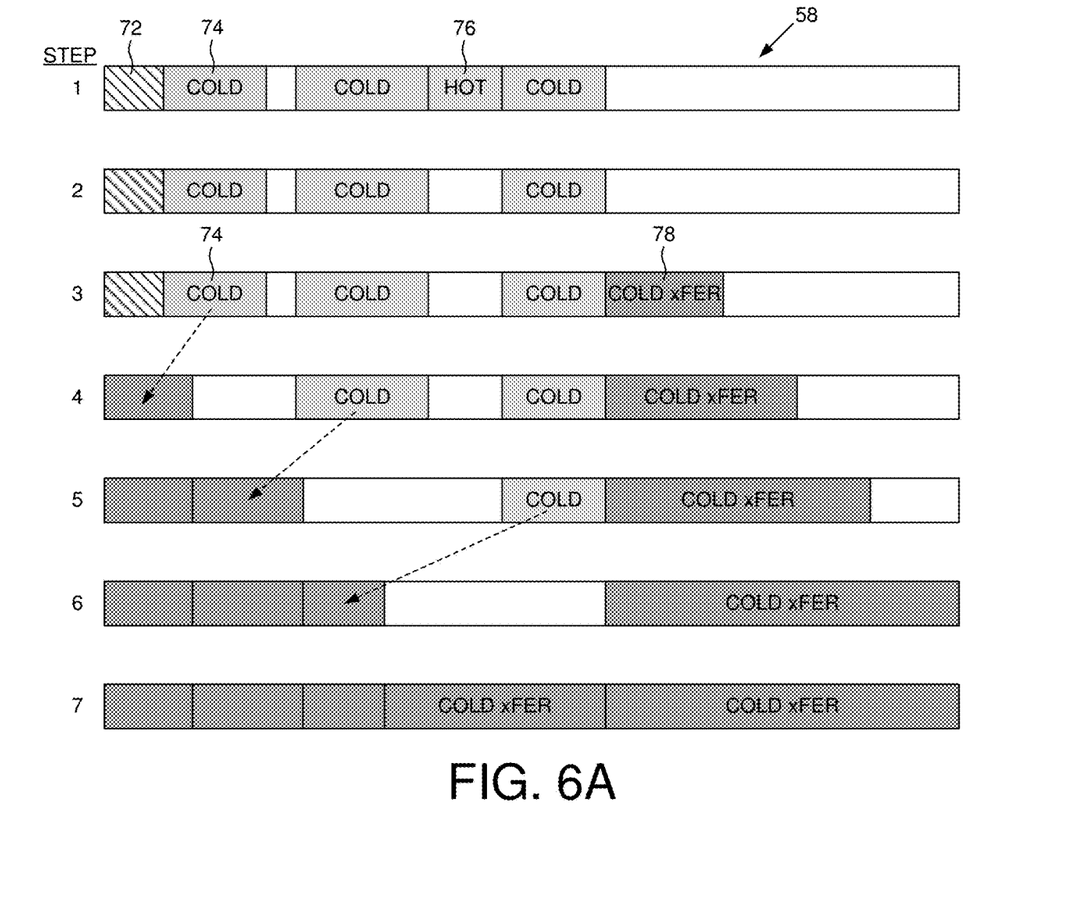
FIG. 6A shows an embodiment wherein after decreasing the spin speed of a cold disk drive, hot data is transferred from the cold disk drive to a hot disk drive, and cold data is transferred from a hot disk drive to the cold disk drive.

FIG. 6A shows an embodiment wherein at Step 1 the span of memory 58 for a hot disk drive (e.g., hot disk drive 68$_2$ in FIG. 5A) includes a reserved gap segment 72, one or more cold segments (e.g., cold segment 74), and one or more hot segments (e.g., hot segment 76). Since a majority of the data stored on the hot disk drive is cold data, the control circuitry 70 selects the hot disk drive for conversion to a cold disk drive. In one embodiment, before converting the hot disk drive the control circuitry 70 migrates the hot data stored on the hot disk drive to a different hot disk drive such as by migrating hot segment 76 as shown in Step 2 of FIG. 6A. The control circuitry 70 then commands the hot disk drive to reconfigure into a cold disk drive, including to decrease the spin speed and increase the capacity by enabling the higher density disk format for subsequent write operations. At Step 3 of FIG. 6A, the reconfigured cold disk drive begins rewriting the cold segments (e.g., cold segment 74) as described above. In addition, the control circuitry 70 begins migrating cold data from other hot disk drives to the cold disk drive, wherein the migrated cold data (e.g., cold segment 78) is written to the cold disk drive at the slower spin speed and higher density disk format. This rewrite/migration process continues through Step 6 of FIG. 6A, wherein all of the previously written data remains recoverable using the corresponding disk format (i.e., either the high spin speed disk format or the low spin speed disk format). After rewriting all of the cold segments, at Step 7 of FIG. 6A the control circuitry 70 continues the migration of cold data from other hot disk drives until the cold disk drive reaches its full capacity. The full cold disk drive may then be swapped out of the data storage device and replaced with an empty hot disk drive.

Figure 6B:
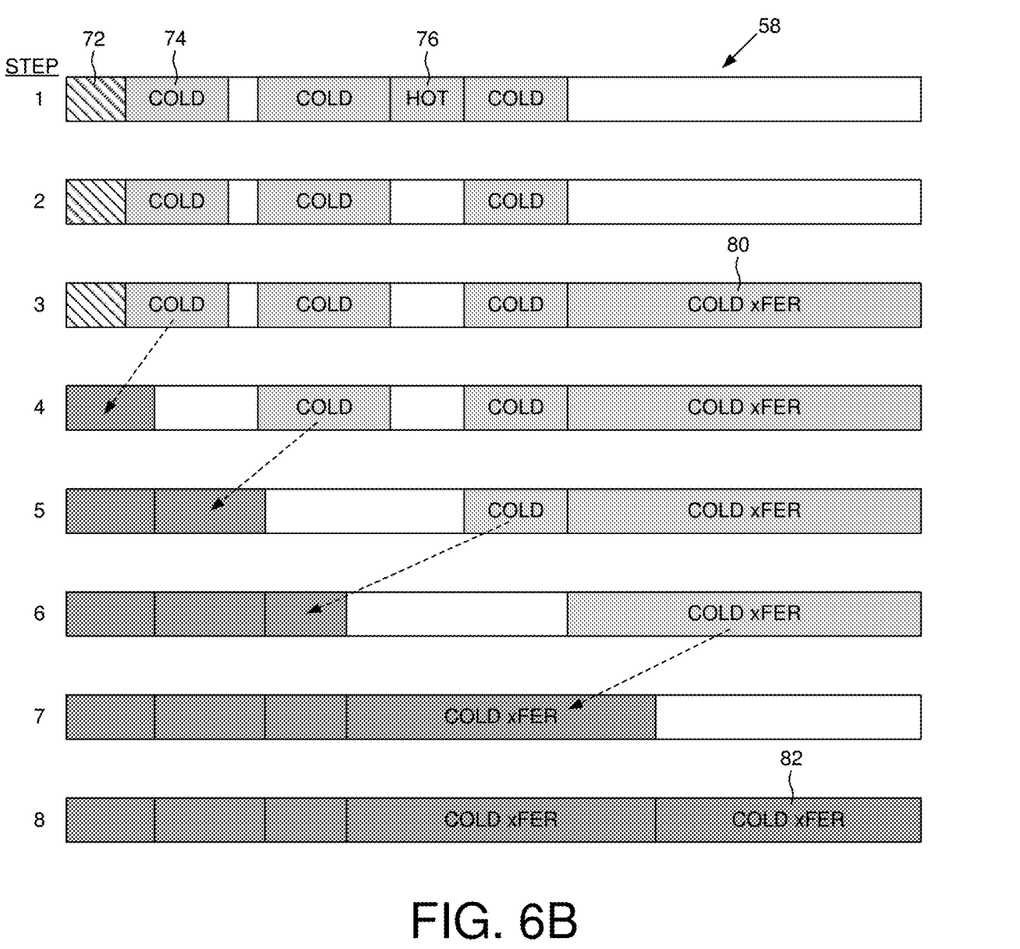
FIG. 6B shows an embodiment wherein before decreasing the spin speed of a cold disk drive, hot data is transferred from the cold disk drive to a hot disk drive, and cold data is transferred from a hot disk drive to the cold disk drive.

FIG. 6B shows an alternative embodiment wherein when the control circuitry 70 selects a hot disk drive for conversion to a cold disk drive, the hot segments of the selected disk drive are migrated to other hot disk drives, and cold segments from other hot disk drives are migrated to the selected disk drive prior to converting the selected disk drive into a cold disk drive. This is illustrated in FIG. 6A wherein at Step 2 the hot segment 76 of the selected disk drive is migrated to another hot disk drive, and at Step 3 cold segments are migrated from other hot disk drives to cold segment 80 of the selected disk drive. The cold segment 80 is written to the selected disk drive at the higher spin speed and lower density disk format, thereby decreasing the migration time of the cold segments from the other hot disk drives. After migrating a predetermined amount of cold segments from other hot disk drives, the selected disk drive is swapped out of the data storage device and replaced with an empty hot disk drive. The selected disk drive may then be inserted into a different data storage device dedicated to storing cold data, and then converted into a cold disk drive. For example, in one embedment when the disk drive is powered on it may detect the host system is a cold data storage device and therefore reconfigure itself into a cold disk drive by decreasing the spin speed and enabling the higher density disk format. Referring again to FIG. 6B, during Steps 4-7 the cold disk drive may proceed to rewrite the cold segments at the higher density disk format, including to rewrite cold segment 80, in order to increase the capacity of the cold disk drive. At Step 8 of FIG. 6B, the cold disk drive may receive additional cold data (e.g., from hot disk drives of other hot data storage devices) which is written to the disk(s) at the higher density disk format (e.g., cold segment 82).

In one embodiment, the data storage devices may be tiered into more than two levels (hot and cold). For example, the data storage devices may be tiered into three levels (hot, medium, cold) wherein at each lower level the disk drives of the data storage device may be configured to operate at a slower spin speed and higher density disk format. In yet another embodiment, when a disk drive transitions from a hotter level to a colder level, other operating aspects of the disk drive may be modified, for example, to reduce the power consumption. For example, in one embodiment when converting a hot disk drive into a cold disk drive, the spin-up acceleration may be decreased in order to decrease the spin-up power consumption, and/or the seek profiles may be modified in order to decrease the power consumption of the VCM(s) when seeking the heads over the disks.

In one embodiment, the process of rewriting the data that was written at the higher spin speed, such as rewriting the cold segments at the higher density disk format as described above, is deferred until the disk drive executes a refresh operation. A disk drive may execute a refresh operation by rewriting data previously written to the disk that has degraded over time, thereby helping to ensure the data remains recoverable. Accordingly in one embodiment, rewriting lower density data as described above based on the higher density disk format during a refresh operation saves on power consumption and bandwidth of the data storage device. After the refresh operation, not only is the data refreshed, but the capacity of the cold disk drive is also increased due to rewriting the lower density data based on the higher density disk format.

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a data storage controller, or certain operations described above may be performed by a read channel and others by a data storage controller. In one embodiment, the read channel and data storage controller are implemented as separate integrated circuits, and in an alternative embodiment they are fabricated into a single integrated circuit or system on a chip (SOC). In addition, the control circuitry may include a suitable power large scale integrated (PLSI) circuit implemented as a separate integrated circuit, integrated into the read channel or data storage controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry. In some embodiments, at least some of the flow diagram blocks may be implemented using analog circuitry (e.g., analog comparators, timers, etc.), and in other embodiments at least some of the blocks may be implemented using digital circuitry or a combination of analog/digital circuitry.

In various embodiments, a disk drive may include a magnetic disk drive, a hybrid disk drive comprising non-volatile semiconductor memory, etc. In addition, some embodiments may include electronic devices such as computing devices, data server devices, media content storage devices, etc. that comprise the storage media and/or control circuitry as described above.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A data storage device comprising:
a disk;
a head actuated over the disk; and
control circuitry configured to:
spin the disk at a first speed while writing first data to the disk based on a first disk format defining a first capacity for the disk;
receive a command from a host to spin the disk at a second speed different from the first speed;
spin the disk at the second speed while writing second data to the disk based on a second disk format defining a second capacity for the disk different from the first capacity; and
read the first data from the disk based on the first disk format while spinning the disk at the second speed.

2. The data storage device as recited in claim 1, wherein:
the first disk format comprises a first data track density; and
the second disk format comprises a second data track density different from the first data track density.

3. The data storage device as recited in claim 1, wherein:
the first disk format comprises a first linear bit density; and
the second disk format comprises a second linear bit density different from the first linear bit density.

4. The data storage device as recited in claim 1, wherein the control circuitry is further configured to spin the disk at the second speed after a power-on reset of the data storage device.

5. The data storage device as recited in claim 1, wherein the control circuitry is further configured to overwrite the first data with the second data.

6. The data storage device as recited in claim 1, wherein the second capacity is higher than the first capacity.

7. A data storage device comprising:
a first disk drive comprising a first disk;
a second disk drive comprising a second disk; and
control circuitry configured to:
command the first disk drive to spin the first disk at a first speed while writing first data to the first disk;
command the second disk drive to spin the second disk at the first speed while writing second data to the second disk;
transfer at least part of the first data from the first disk drive to the second disk drive; and
command the second disk drive to spin the second disk at a second speed slower than the first speed while writing third data to the second disk.

8. The data storage device as recited in claim 7, wherein the control circuitry is further configured to transfer the at least part of the first data from the first disk drive to the second disk drive while the second disk drive is rotating the second disk at the first speed.

9. The data storage device as recited in claim 7, wherein the control circuitry is further configured to transfer the at least part of the first data from the first disk drive to the second disk drive while the second disk drive is rotating the second disk at the second speed.

10. The data storage device as recited in claim 7, wherein the at least part of the first data transferred to the second disk drive is cold data.

11. The data storage device as recited in claim 10, wherein the control circuitry is further configured to transfer at least part of the second data from the second disk drive to the first disk drive, wherein the at least part of the second data is hot data.

12. The data storage device as recited in claim 8, wherein the second disk drive is further configured to rewrite the at least part of the first data to the second disk at a higher capacity disk format while rotating the second disk at the second speed.

13. The data storage device as recited in claim 12, wherein the second disk drive is further configured to write the third data to the second disk at the higher capacity disk format while rotating the second disk at the second speed.

14. The data storage device as recited in claim 13, wherein the control circuitry is further configured to read at least part of the first data from the second disk drive prior to the second disk drive rewriting the first data at the higher capacity format.

15. The data storage device as recited in claim 13, wherein the second disk drive is further configured to rewrite the at least part of the first data to the second disk during a refresh operation.

16. A data storage device comprising:
a disk;
a head actuated over the disk; and
a means for spinning the disk at a first speed while writing first data to the disk based on a first disk format defining a first capacity for the disk;
a means for receiving a command from a host to spin the disk at a second speed different from the first speed;
a means for spinning the disk at the second speed while writing second data to the disk based on a second disk format defining a second capacity for the disk different from the first capacity; and
a means for reading the first data from the disk based on the first disk format while spinning the disk at the second speed.

17. The data storage device as recited in claim 16, wherein:
the first disk format comprises a first data track density; and
the second disk format comprises a second data track density different from the first data track density.

18. The data storage device as recited in claim 16, wherein spinning the disk at the second speed occurs after a power-on reset of the data storage device.

19. A data storage device comprising:
a disk;
a head actuated over the disk; and
control circuitry configured to:
spin the disk at a first speed while writing first data to the disk based on a first disk format defining a first capacity for the disk;
receive a command from a host to spin the disk at a second speed different from the first speed;
spin the disk at the second speed while writing second data to the disk based on a second disk format defining a second capacity for the disk different from the first capacity, wherein the first data is completely overwritten with the second data.

* * * * *